United States Patent

Luft

[15] 3,679,018
[45] July 25, 1972

[54] DUAL STATION TRANSMISSION CONTROL

[72] Inventor: Robert G. Luft, Wildwood, Ill.
[73] Assignee: International Harvester Company, Chicago, Ill.
[22] Filed: July 7, 1970
[21] Appl. No.: 52,938

[52] U.S. Cl. ..........................180/77 S, 60/57 R, 60/97 P, 74/367, 74/665 G, 180/44 R, 180/70
[51] Int. Cl. .......................................................B60k 19/02
[58] Field of Search..................180/77 S, 77 R, 24.06, 54 C; 74/665 G, 665 GA

[56] References Cited

UNITED STATES PATENTS 2,728,463   12/1955   Beckwith..........................180/77 R X
3,512,277    5/1970   Stuller..............................180/77 R X
3,550,478   12/1970   Bechman et al..................180/77 R X Primary Examiner—A. Harry Levy
Attorney—Floyd B. Harman

[57] ABSTRACT

A means for controlling a pair of transmissions on a vehicle having dual power trains from either one of a pair of operator stations. A station selector valve directs air pressure to a selected valve means connected with slave cylinders for conditioning the power trains for direction of travel and speed range. The selected valve means is movable to properly direct the air pressure by a cam means selectively positionable by an operator.

6 Claims, 2 Drawing Figures

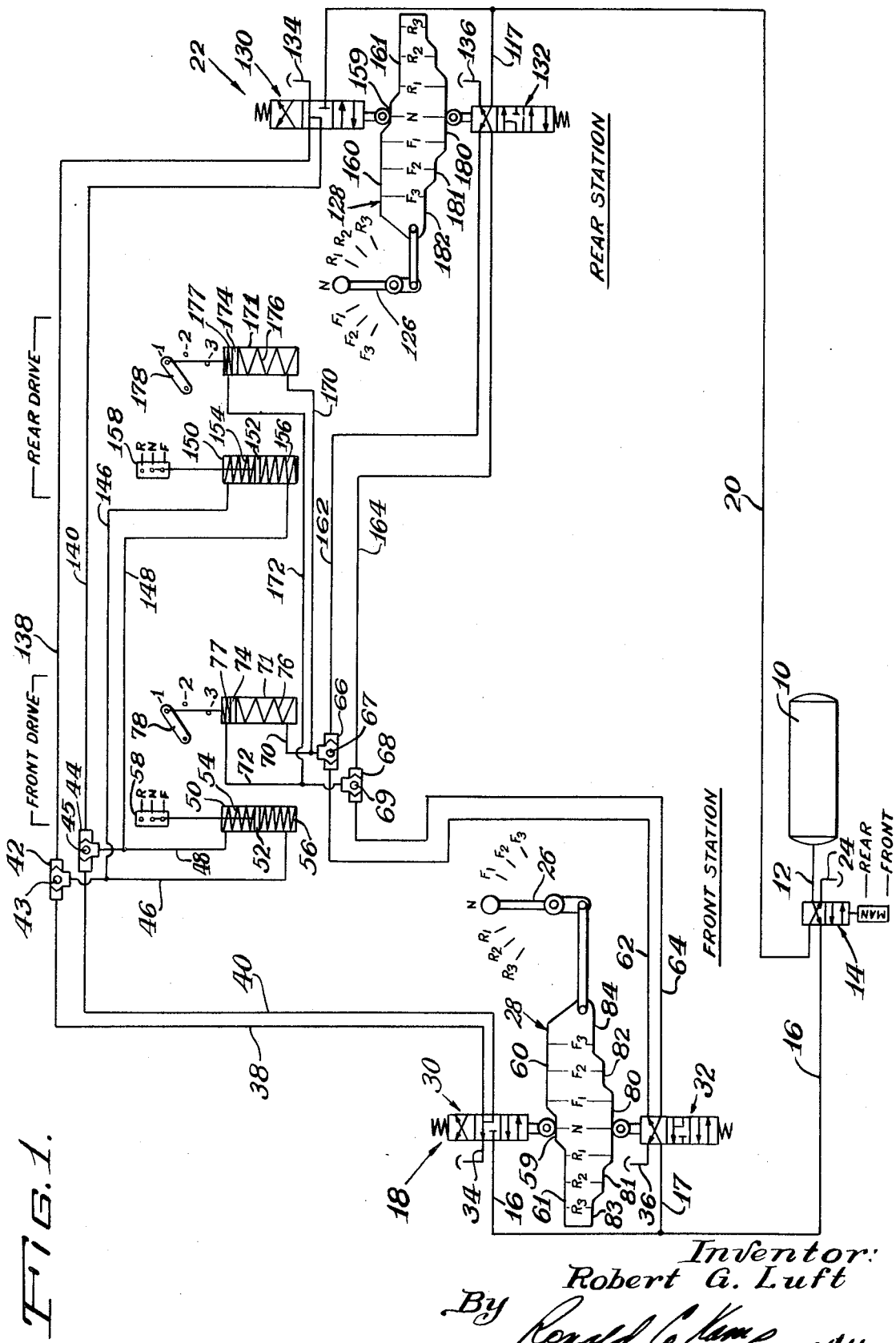

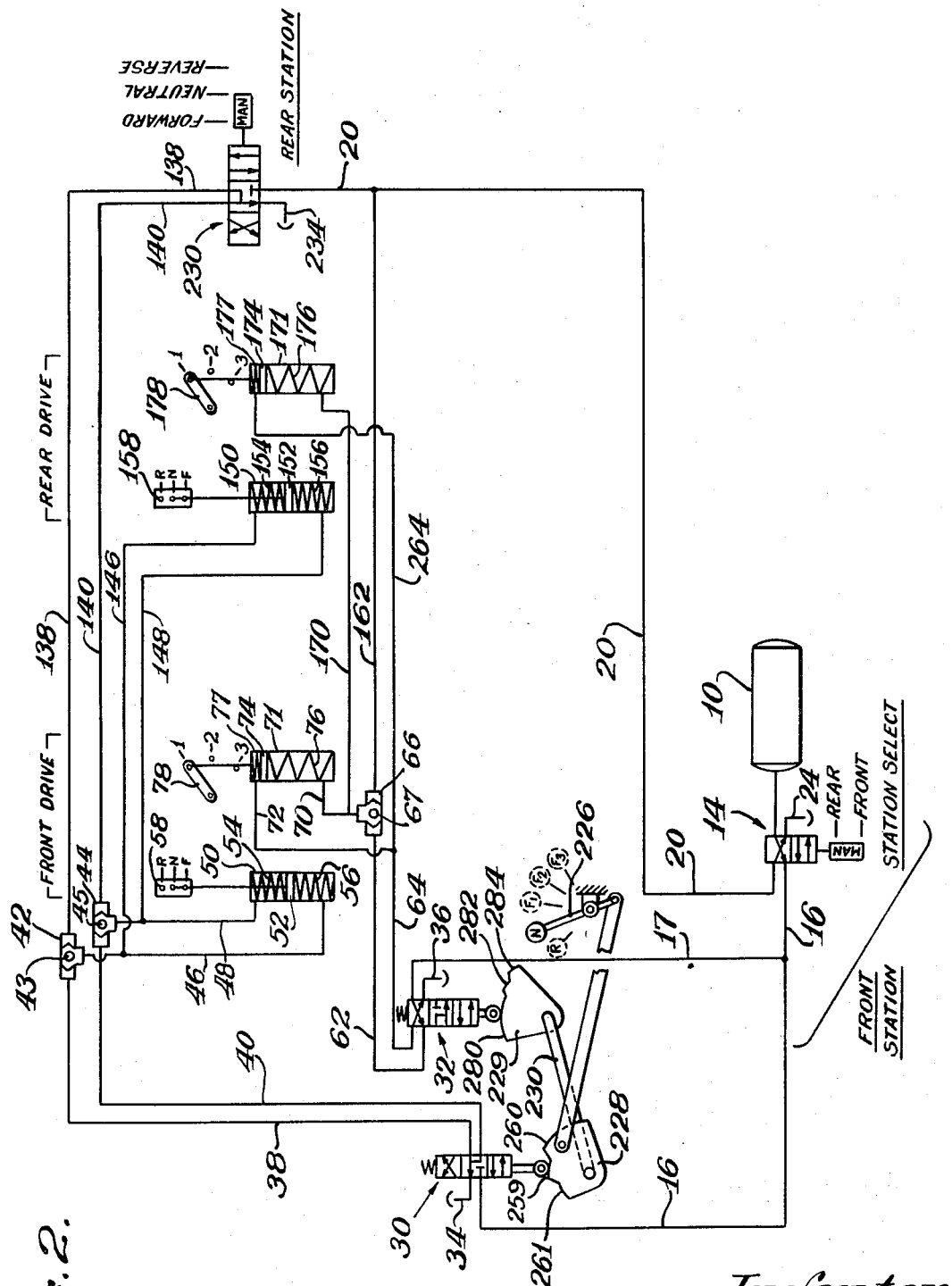

DUAL STATION TRANSMISSION CONTROL

CROSS REFERENCE TO RELATED APPLICATION

This application is related to that disclosed and claimed in the application of Robert G. Luft and Edward A. Bott entitled DRIVE TRAIN FOR LOW PROFILE VEHICLE, Ser. No. 796,371 filed Feb. 4, 1969 and since issued as U.S. Pat. No. 3,614,989.

BACKGROUND AND SUMMARY OF THE INVENTION

In certain large vehicles, such as those utilized to tow the jumbo jet aircraft, the size of the machine requires a control compartment or operator's station at each end thereof. Such dual operator stations are provided so that the operator may be positioned at the forward end of the vehicle regardless of its direction of travel. These dual stations impose a requirement for controlling the drive train from either of the stations. In addition, such vehicles must have sufficient drawbar power to move the aircraft at acceptable ground speeds, while maintaining a relatively low profile to permit the tractor to be driven underneath the wings of the aircraft. In order to fulfill both requirements, it has been found advantageous to provide two engines with separate drive trains from each engine to independent spaced axles on the vehicle. It is therefore necessary to provide some means for controlling and coordinating the two separate drive trains from either of the dual operator stations.

It is, therefore, an object of the present invention to provide a means for controlling and coordinating two separate, independent drive trains on a vehicle.

It is also an object of this invention to provide a means for controlling and coordinating two separate and independent drive trains on a vehicle from two different operator stations.

These, and other objects of the present invention, and many of its attendant advantages, will become readily apparent upon a perusal of the following description and the accompanying drawings, wherein:

FIG. 1 is a schematic view of a control means according to the present invention; and FIG. 2 is a schematic representation of a second embodiment of a control means for a pair of drive trains according to the present invention.

DESCRIPTION OF ONE PREFERRED EMBODIMENT

Referring now to the embodiment shown in FIG. 1, a vehicle, not shown but which may be of the type disclosed in U.S. Pat. No. 3,614,989, is provided with an air reservoir 10. A conduit 12 connects the air reservoir 10 with a station selector valve 14, which is of the two-position, four-port type. In its front position, as illustrated in FIG. 1, the valve 14 provides fluid communication between the conduit 12 and a conduit 16 which communicates with the valve means, indicated generally at 18, in the front station, while simultaneously connecting the conduit 20, which communicates with the valve means, indicated generally at 22 in the rear station, with the atmosphere through conduit 24. When the station selector valve 14 is shifted to its rear position conduit 12 is placed in fluid communication with the conduit 20 while the conduit 16 is exhausted to atmosphere through the conduit 24.

Considering now the valve means 18 and its control, a manually movable control handle or lever 26 is linked with a cam means 28 so that rotation of the lever 26 results in axial movement of the cam 28. The value means 18 comprises a forward-neutral-reverse valve 30 and a speed range valve 32. Each of the valves 30 and 32 is provided with a roller engageable with the cam plate 28 and a spring biased means which urges the roller into contact with the cam plate 28. Each of the valves 30 and 32 are of the three-position, four-port type. A conduit 16 connects with the valve 30 and a branch conduit 17 connects with the conduit 16 and communicates with the valve 32. The valves 30 and 32 are provided with exhaust ports 34 and 36, respectively. A pair of conduits 38 and 40 communicate with the valve 30 and are respectively connected with T connectors 42 and 44. The T connectors 42 and 44 are provided with double seats and ball check valves 43 and 45, respectively. The conduit 138 connects with the T connector 42 and a conduit 140 connects with the T connector 44. The function of the T connector and the conduits 138 and 140 will be explained hereinafter. A conduit 46 communicates with the T connector 42 intermediate the two seats and communicates with the head end of a slave cylinder 50. A second conduit 48 connects with the T connector 44 intermediate its seats and communicates with the rod end of the slave cylinder 50. The slave cylinder 50 includes a piston 52 which is biased by means of springs 54 and 56 to a position intermediate the cylinder 50. The piston 52 is connected with an operator means indicated schematically at 58 for shifting the direction of travel transmission to its reverse neutral or forward attitude. The operator 58 may, for example, be a detented hydraulic valve which directs hydraulic fluid or exhausts hydraulic fluid from the proper clutch packs within the forward-reverse transmission. With the valve 30 in its neutral position as shown in FIG. 1, both of the conduits 38 and 40 are exhausted to atmosphere through the port 34. This permits the springs 54 56 to position the piston 52 in its neutral position, and hence, the operator 58 will condition the forward-reverse transmission for neutral. When the valve 30 is shifted upwardly as viewed in FIG. 1, conduit 38 will be connected with atmosphere and conduit 40 will receive air pressure through the conduit 16. Air pressure appearing in conduit 40 will pass through the T connector 44 and the conduit 48 to shift the piston 52 downward, as viewed in FIG. 1, causing the operator to be shifted to its forward or F position. When the valve 30 is moved downwardly as viewed in FIG. 1, the conduit 40 will be connected with the exhaust port 34 and conduits 16 and 38 will be placed in communication. Air pressure will be communicated through conduit 16, conduit 38, T connector 42 and conduit 46 to the head end side of the piston 52. The higher pressure on the head end side will cause the piston 52 to be moved upwardly thereby shifting the operator to its reverse or R position. Shifting of the spool in the valve 30 is achieved by the upper surface of the cam 28 which is provided with a surface 59 which positions the valve in its center neutral attitude and a surface 60 which elevates or raises the spool to its forward position and a surface 61 which permits the spool 32 to shift to its lowered or reverse position.

Since it is contemplated that the dual engines will be positioned within the vehicle facing in opposite directions, the directions of rotation of the two engines will be also in opposite directions. Hence, it will be necessary therefore to condition one transmission for reverse drive when the other transmission has been conditioned for forward drive and similarly, to condition the one transmission for forward drive when the other transmission has been conditioned for reverse drive. In order to accomplish this, a conduit 146 communicates with the conduit 46 and with the rod end of the slave cylinder 150. A second conduit 148 communicates with the conduit 48 and with the head end of the cylinder 150. Hence, when fluid pressure appears in conduit 46 in order to shift the operator 58 to its reverse position, pressure will simultaneously appear in conduit 146 in order to shift the operator 158 to its forward position. Similarly, when fluid pressure appears in conduit 48 in order to shift the operator 58 for forward drive of the transmission associated therewith, fluid pressure will simultaneously appear in conduit 148 in order to shift the operator 158 for the other forward-reverse transmission to reverse drive.

A pair of conduits 62 and 64 communicate with the valve 32 and connect with T connectors 66 and 68, respectively, which connectors are double-seated and provided with ball check valves 67 and 69. A conduit 70 communicates with the T connector 66 intermediate its seats and with the head end of the slave cylinder 71. Another conduit 72 communicates with the T connector 68 intermediate its seats and with the rod end of the slave cylinder 71. The slave cylinder 71 is provided with a piston 74 which is spring biased by means of spring 76 to its upper position. The piston 74 is connected with an operator 78 which is movable between three positions representing the three speeds available on a three-speed speed range transmission. The operator 78 may, for example, be connected with a valve which directs hydraulic pressure to or exhausts hydraulic pressure from the proper clutch packs within the speed range transmission in order to achieve the three different speeds. In the position shown in FIG. 1, and the position to which the piston 74 is urged by the bias of spring 76 and fluid pressure in the head end of cylinder 71, the operator 78 conditions the speed range transmission for first gear. The cam plate 28 is provided with a surface 80 which maintains the valve 32 in the position shown in the drawing when the lever 26 is in any one of the neutral position the first gear reverse and first gear forward position. When the operator moves the handle or lever 26 to the R2 or F2 position the valve 32 is permitted to be moved upwardly into contact with the surfaces 81 and 82, respectively, blocks the conduit 17 and connects both conduits 62 and 64 with exhaust part 36. Atmospheric pressure appears in both conduits 62 and 64 and in conduits 72 and 70 which pressures acting on effectively equal surfaces permits the bias of the springs 76 and 77 to cause the piston 74 to be centered within the cylinder 71. Simultaneously, atmospheric pressure will appear in conduit 172 which connects with conduit 72 and with the rod end of the slave cylinder 171 for the other speed range transmission. Similarly, a conduit 170 communicates with the conduit 70 and with the head end of the cylinder 171. Hence, when the handle is moved to either the R2 or F2 position, the valve 32 will be moved to its center position directing atmospheric pressure through both conduits 62 and 64 to conduits 72, 172, 70 and 170. Centering of both the pistons 74 and 174 will cause the operators 78 and 178 to be moved to a position in which both speed range transmissions will be conditioned for second gear. Movement of the control handle 26 to either the R3 or F3 position will cause the valve 32 to contact the surfaces 83 and 84, respectively and shifting the valve 32 to a position in which fluid pressure is directed through conduit 17 to the conduit 64 while the conduit 62 is exhausted to atmosphere through the port 36. Fluid pressure appearing in conduit 64 will pass through the T connector 68 and into the conduits 72 and 172. The absence of fluid pressure on the head end side of the pistons 74 and 174 coupled with the pressure appearing on the rod end side of these pistons will cause the pistons 74 and 174 to be shifted as far downwardly as possible. The operators 78 and 178 will be simultaneously moved to the position in which both speed range transmissions are conditioned for third gear.

The rear station valve means 22 and its control are identical to that utilized for the front station. All of the components for the rear station have therefore been symbolized by the same number prefixed with the No. 1. When the station selector valve 14 is in its front position, conduit 20 will be vented to atmosphere. Hence, any manipulation of the control handle 126 in the rear station will have no affect upon the position of the slave cylinders. The four T connectors 42, 44, 66 and 68 and their respective ball check valves will isolate the conduits connecting with the rear station valve means 22 from the remainder of the system. In a similar manner, when the station selector valve is moved to its rear position, the conduit 16 will be exhausted to atmosphere and the control lever 26 and the associated valve means 18 will be completely ineffective to control the position of the slave cylinders. With the station selector valve 14 so positioned, the T connectors 42, 44, 66 and 68 will function to isolate the conduits 38, 40, 62 and 64 from the remainder of the system. This permits exclusive control of both the front drive and the rear drive by means of the control lever 126.

The embodiment shown in FIG. 2 is similar to that shown in FIG. 1 except that it permits only one speed range in reverse and only the selection of one speed range in forward from the rear station. In this embodiment all of the components which are similar to that disclosed in conjunction with the embodiment of FIG. 1 have been identified by the same reference number. Since this embodiment provides only three speeds forward and one in reverse from the front station, the control lever 226 is movable to only three positions indicated as F1, F2 and F3 clockwise from the neutral position. A pair of cam plates 228 and 229 are linked to the control lever 226 and rotatable about the axis of a shaft 230. The valve 30 engages the cam plate 228 which is provided with a surface 259 which positions the valve 30 for neutral and conditions the operator 58 for neutral operation of the forward-reverse transmission in the same manner as that described previously. In all of the forward positions of the control lever 226 the surface 260 of the cam 228 is in contact with the valve 30 causing it to be shifted upward, as viewed in FIG. 2. This directs fluid pressure to the conduit 40 while exhausting the conduit 38 to atmosphere and thereby causing the pistons 52 and 152 to be moved downward and upward respectively and the operators 58 and 158 to condition the forward-reverse transmission for forward and reverse operation respectively. Movement of the control lever 226 to the R position causes the cam surface 261 to come into contact with the roller of the valve 32 permitting the spring bias to shift the valve 30 downward. This directs hydraulic fluid pressure to conduit 38 while exhausting fluid pressure from the conduit 40. The fluid pressure present in conduit 38, 46 and 146 will move the pistons 52 and 152 upward and downward respectively to condition the operators 58 and 158 for reverse and forward drive. The cam plate 229 has a cam surface 280 which is engaged by the roller of the valve 32 whenever the lever 226 is in the reverse, neutral and F1 position. When the roller is in contact with the surface 280 the valve 32 is in the position which conditions the speed range transmissions in both the front and rear drive for first gear. This is accomplished by connecting the conduit 64, which connects directly with the conduit 72 and with a conduit 264 for communicating with the rod end of each of the cylinders 71 and 171, to atmosphere through the port 36. Fluid pressure is directed through the conduit 17 to the conduit 62 which connects with the T connector 66 in the same manner as described previously. Fluid pressure is directed from the T connector 66 through conduit 70 and 170 to the head end side of the slave cylinders 71 and 171. Hence, the operators 78 and 178 will be conditioned for first gear. The cam plate 229 is provided with a cam surface 282 at a greater radius from the axis of the rod 230, which shifts the valve spool 32 upward so that atmospheric pressure is directed from the port 36 to both the conduits 62 and 64. The substantially equal force on each side of the pistons 74 and 174 will cause them to be centered within the cylinder by the springs 76, 77 and 176, 177 respectively, thereby moving the operators 78 and 178 to condition the speed range transmissions for second gear. A third cam surface 284 on the cam plate 229 is at still a greater radius from the axis of the rod 230 and shifts the valve spool 32 still farther upward so that conduit 62 is vented to atmosphere through port 36 and fluid pressure is directed through the conduit 17 to the conduit 64. The presence of fluid pressure in conduits 72 and 264 will cause the pistons 74 and 174 to be retracted as far as possible in their respective cylinders 71 and 171. The operators 78 and 178 will therefore be moved to condition the speed range transmission for third gear.

The rear station is provided with a single three-position, manually operated valve 230. The conduit 20 provides communication between the station selector valve 14 and the valve 230. An exhaust port 234 is provided for the valve and the conduits 138 and 140 communicate with the valve 230. The conduit 162 connects with the conduit 20 and with the T connector valve 66. Hence, regardless of the position of the lever 226 in the front station, whenever the station selector valve 14 is moved to the rear position, fluid pressure will be directed through the conduit 20 and the conduit 162 to the T connector 66. The ball check valve 67 will block communication with the conduit 62 while permitting communication with the conduit 70 and 170. The fluid pressure on the head end side of the cylinders 71 and 171 will assist the bias of the springs 76 and 176 to move the operators 78 and 178 to their first gear position. The valve 230 cannot affect the position of the slave cylinders 71 and 171 and, hence, the valve 230 functions merely to control the forward-reverse transmission. In the position shown in the drawings, the valve 230 places both conduits 138 and 140 in communication with the exhaust port 234 which permits the springs 54 and 56 in the slave cylinder 50 and the springs 154 and 156 in the slave cylinder 150 to center the pistons 52 and 152. The operators 58 and 158 will therefore be positioned in their neutral position as indicated by the letter N in FIG. 2 so that the forward-reverse transmissions are conditioned for neutral. When the valve 230 is moved to the left as viewed in FIG. 2, conduit 20 is placed in communication with conduit 138 while the conduit 140 is placed in communication with the exhaust port 234. Fluid pressure appearing in conduits 46 and 146 will shift the piston 52 upward. This will move the operator 58 to its R position and condition the front drive transmission for reverse. Simultaneously, pressure in conduit 146 will shift the piston 152 downward, moving the operator 158 to its F or forward position. The forward-reverse transmission in the rear drive will therefore be conditioned for forward travel. When the valve 230 is shifted to the right as viewed in FIG. 2, the conduit 20 will be placed in communication with the conduit 140 while the conduit 138 will be connected with the exhaust port 234. Fluid pressure appearing in conduit 140 will be communicated through the T valve 44 to the conduits 48 and 148. This will cause the piston 52 to be shifted downward and the piston 152 to be shifted upward. The operator 58 will therefore be conditioned for forward drive while the operator 158 will be conditioned for reverse drive.

While two embodiments of the present invention have been disclosed herein, it is to be understood that various changes and modifications may be made without departing from the spirit of the invention as defined by the scope of the appended claims.

What is claimed is:

1. In a vehicle having a pair of drive trains, each of which includes a forward-reverse and speed range transmission; a means for controlling said drive trains comprising:
    first operator means for determining the direction of travel of said transmission;
    first slave cylinder means operatively connected with said first operator means;
    second operator means for determining the speed range of said transmissions;
    second slave cylinder means operatively connected with said second operator means;
    first valve means connected with each of said slave cylinder means; and
    first cam means movable to shift said first valve means in order to condition each of the drive trains for the same speed range and the desired direction of travel.

2. The invention according to claim 1, and further comprising:
    second valve means connected with said slave cylinder means;
    a selector valve means for selectively directing fluid pressure to one of said valve means;
    check valve means for isolating said first valve means from said slave cylinder means, and second cam means movable to shift said second valve means.

3. In a vehicle having a pair of drive trains, each of which includes forward-reverse and speed change transmissions; a means for controlling and coordinating the drive trains comprising:
    slave cylinder means operatively connected with said transmissions;
    valve means for selectively directing fluid pressure to said slave cylinder means;
    cam means engageable with the valve means for shifting the latter to condition simultaneously one of said drive trains for forward drive and the other to reverse drive and for conditioning both drive trains for the same speed ratio.

4. A means for controlling a pair of transmissions driven by opposite rotating engines and having forward and reverse, and speed change capability comprising:
    slave cylinder means connected with the transmissions;
    valve means for selectively directing fluid pressure to the slave cylinder means;
    cam means engageable with the valve means for shifting said valve means to condition one transmission for forward drive and to condition the other transmission for reverse drive and to simultaneously condition both transmissions for the same speed range.

5. In a vehicle having a pair of drive trains independently connected between opposite rotating engines and separate axles, each drive train including a speed-change transmission and a forward-reverse transmission; a means for controlling and coordinating said drive trains comprising:
    a first slave cylinder operatively connected with one speed change transmission;
    a second slave cylinder operatively connected with the other speed change transmission;
    speed range valve means connected in parallel with said first and second slave cylinders so that actuation of said speed valve means cause both speed range transmissions to be in the same speed range;
    a third slave cylinder operatively connected to one forward-reverse transmission;
    a fourth slave cylinder operatively connected to the other forward-reverse transmission;
    direction of travel valve means communicating with said third and fourth salve cylinders so that actuation of said direction valve means causes said forward-reverse transmissions to be conditioned for opposite directions; and
    cam means engageable by said speed range and direction of travel valve means for selectively shifting said valve means.

6. The invention according to claim 5, and further comprising:
    a rear station valve means communicating with said third and fourth slave cylinders; and
    a selector valve means for isolating said direction and speed valve means while simultaneously directing fluid pressure to said rear station valve means and to said first and second slave cylinders to condition both speed range transmissions for a common speed range.

* * * * *